US012725581B1

(12) United States Patent
Ooi et al.

(10) Patent No.: US 12,725,581 B1
(45) Date of Patent: Sep. 1, 2026

(54) MIXED HIGH DYNAMIC RANGE (HDR) AND STANDARD DYNAMIC RANGE (SDR) MODE ENABLEMENT IN LIQUID CRYSTAL DIODE (LCD) DISPLAYS

(71) Applicant: DELL PRODUCTS L.P., Round Rock, TX (US)

(72) Inventors: Ghee Beng Ooi, Singapore (SG); Chih-Hao Kao, Singapore (SG); Dengzhai Xiong, Singapore (SG); Boon Wee Quek, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/306,168

(22) Filed: Aug. 21, 2025

(51) Int. Cl.
*G09G 3/34* (2006.01)
*G09G 3/36* (2006.01)

(52) U.S. Cl.
CPC ............. *G09G 3/3426* (2013.01); *G09G 3/36* (2013.01); *G09G 2320/0626* (2013.01); *G09G 2320/0646* (2013.01); *G09G 2320/0666* (2013.01); *G09G 2320/0673* (2013.01)

(58) Field of Classification Search
CPC ........... G09G 3/34; G09G 3/36; G09G 3/3618
See application file for complete search history.

(56) References Cited

U.S. PATENT DOCUMENTS

| | | | | |
|---|---|---|---|---|
| 8,698,716 | B2 | 4/2014 | Lu et al. | |
| 10,242,628 | B2 | 3/2019 | Lee et al. | |
| 12,014,669 | B1 | 6/2024 | Waggoner | |
| 12,230,224 | B1 * | 2/2025 | Pieri | G09G 3/3413 |
| 2020/0053271 | A1 * | 2/2020 | Aiba | H04N 1/00461 |
| 2023/0120655 | A1 * | 4/2023 | Seo | G09G 5/005 345/690 |

* cited by examiner

*Primary Examiner* — Kevin M Nguyen
(74) *Attorney, Agent, or Firm* — Larson Newman, LLP

(57) ABSTRACT

A system to enable the rendering of mixed-mode high dynamic range (HDR) and standard dynamic range (SDR) content on a liquid crystal display (LCD). The system includes a a content mode detector and a mixed-mode processor. The content mode detector detects, based on received image data corresponding to an image, a dynamic range of the content of each window within the image. The mixed-mode processor responds to the content mode detector's detecting a first window of the image having HDR content and a second window having SDR content by setting a backlight of the LCD, determining the SDR scaling ratio, and generating an adjusted SDR gamma based on the SDR scaling ratio. In rendering the image on the LCD, a color and brightness of the HDR content and SDR content are dictated by the adjusted SDR gamma and a predetermined electro-optical transfer function (EOTF) corresponding to the HDR content.

20 Claims, 5 Drawing Sheets

300

| | **HDR EOTF** | | |
|---|---|---|---|
| **SDR EOTF** | PQ_1000nits | PQ_500nits | PQ_400nits |
| gamma_2.2 | LUT_1000_2.2 | LUT_500_2.2 | LUT_400_2.2 |
| gamma_2.6 | LUT_1000_2.6 | LUT_500_2.6 | LUT_400_2.6 |

FIG. 3A

302

| | **HDR(x)** | **Look up x for y** |
|---|---|---|
| **SDR(y)** | y=255..1 : x | (y/255)^2.2 * SDR_Max_Lum = PQ (x) |

FIG. 3B

MIXED HIGH DYNAMIC RANGE (HDR) AND STANDARD DYNAMIC RANGE (SDR) MODE ENABLEMENT IN LIQUID CRYSTAL DIODE (LCD) DISPLAYS

FIELD OF THE DISCLOSURE

The present disclosure generally relates to information handling systems, and more particularly relates to the rendering of mixed high dynamic range (HDR) mode and standard dynamic range (SDR) mode images on a single liquid crystal diode (LCD) display based on video data generated by multiple information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system to enable the rendering of mixed-mode high dynamic range (HDR) and standard dynamic range (SDR) content on a liquid crystal display (LCD) may include a content mode detector and a mixed-mode processor. The content mode detector may detect, based on received image data corresponding to an image, a dynamic range of the content of each distinct window within the image. The mixed-mode processor may respond to the content mode detector's detecting a first window of the image having HDR content and a second window having SDR content by setting a backlight of the LCD based on the HDR content, determining the SDR scaling ratio based on the HDR and SDR content, and generating an adjusted SDR gamma based on the SDR scaling ratio. In rendering the image on the LCD, a color and brightness of the HDR content and SDR content may be dictated by the adjusted SDR gamma and a predetermined electro-optical transfer function (EOTF) corresponding to the HDR content.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIGS. 3A and 3B illustrate certain other operative aspects of an embodiment of the system of FIG. 1.

The use of the same reference symbols in different drawings indicates similar or identical items.

DETAILED DESCRIPTION OF THE DRAWINGS

Figure 1:
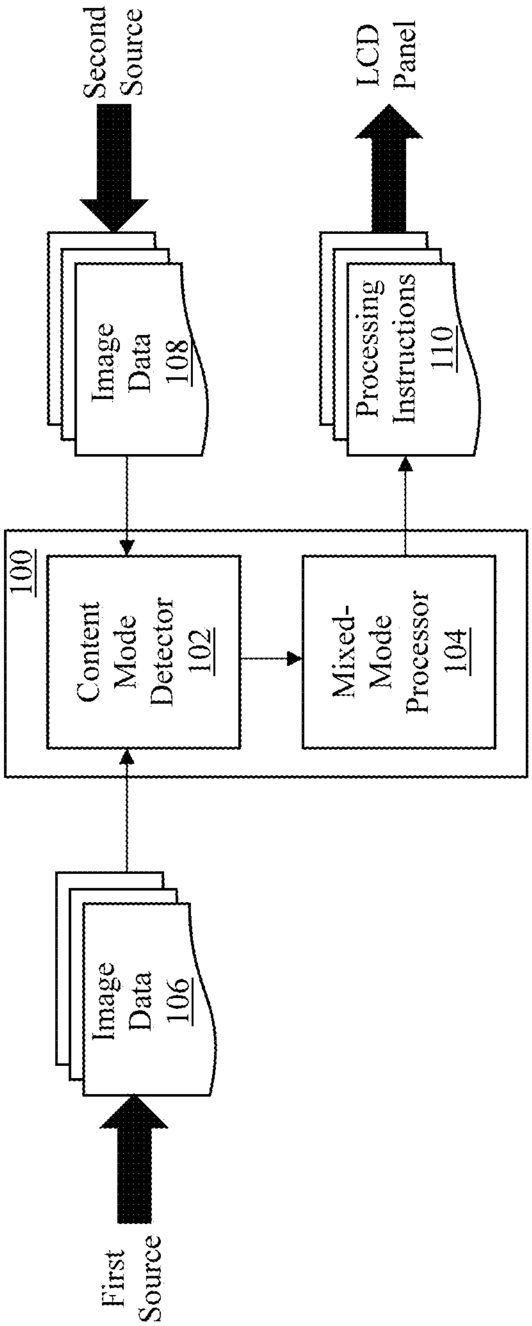
FIG. 1 is a block diagram of a system to enable the rendering of mixed HDR/SDR mode content on an LCD according to at least one embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

A ubiquitous device used in conjunction with desktops, laptops, and other types of information handling systems is a monitor, an output device that visually renders data generated by information handling systems. The data includes, for example, text, images, and/or video that are rendered visually on a screen or panel of the monitor. One type of monitor is the liquid crystal display (LCD), which renders the data on a screen or panel that modulates light using liquid crystals combined with polarizers to produce images. As used herein, "panel" and "screen" refer to the flat surface that actually emits light and renders images; "LCD" more broadly refers to image processing circuitry, interfaces, housing, and other components, as well as the screen or panel formed with LCD technology.

For many tasks such as editing, gaming, and generating designs, a user may utilize multiple information handling systems, each independently generating outputs of visual data. KVM (keyboard, video, mouse) technology enables a user to manage multiple information handling systems with a single setup. With the KVM technology, the user controls multiple information handling systems using one keyboard and/or mouse without having to repeatedly plug and unplug multiple cables and/or perform other setup tasks.

With the KVM-based or another type of control of multiple platforms (e.g., different information handling systems), a user may wish to display on the same LCD screen an image that includes multiple windows generated in response to data from different platforms. The image, in certain arrangements, may be one of a collection of images forming a video, each of the images being an individual video frame. The multiple windows within an image, for example, may have a picture-by-picture (PBP) configuration or a picture-in-picture (PIP) configuration. With the PBP configuration, the separate windows may be rendered side-by-side vertically or horizontally. With the PIP configuration, one of the windows may be rendered as the predominant portion of the image, while the other window is rendered as a smaller overlay. Both configurations are useful for a variety of different uses.

The display content (pixels) that is visually rendered is encoded with a selected power transition curve for the visual rendering. A display device needs to implement corresponding processing of the power transition curve specified by the content in order to render the intended visual effect. In the display domain, the power transition curve is often referred as display gamma or display electro-optical transfer function (EOTF). Both terms are used interchangeably herein.

If each of the multiple windows within the image have the same dynamic range content—either high dynamic range (HDR) or standard dynamic range (SDR) content—the LCD may render the windows in a single mode, either HDR mode or SDR mode depending on their content. If, however, the respective content of the multiple windows within the image have different modes, then rendering the image on the LCD screen may be adversely affected owing to backlight illumination of LCDs. With an edge-lit LCD, light is generated by light-emitting diodes (LED) positioned along the edges of the LCD display's screen, the light guided by light-guide plates and distributed by diffusers. With a direct-lit LCD, light is generated by LEDs arranged in a matrix behind the LCD screen, with the light passing through layers including a diffuser, polarizers, and liquid crystal layer.

In both arrangements, the entire screen of the LCD uses a single gamma electro-optical transfer function (EOTF) curve to render the content. As HDR and SDR content are encoded with different gamma systems, there will be a mismatch if the display gamma is different from the content gamma.

For an image display in HDR mode, greater brightness of the screen backlight is needed. If HDR content is rendered with the LCD operating in SDR mode, then the HDR content may lack fine gradations in shadows, saturated colors may appear dull or inaccurate, and/or blacks may be grayed, for example. Conversely, if SDR content is rendered with the LCD display operating in HDR model, then the SDR content may appear faded or overly bright, colors may be oversaturated or inaccurate, and/or distorted. Thus, the conventional LCD may not be capable of rendering a multi-window image with clarity and without distortion if one window of the image includes HDR content and another includes SDR content.

Embodiments incorporating the teachings of the present disclosure provide systems and methods capable of rendering mixed-mode HDR/SDR content of multiple windows on an LCD that otherwise lacks section-specific control of the lighting of the panel or screen of the LCD. In accordance with certain embodiments, the backlighting of the LCD is set to an HDR-dictated maximum brightness, and data from an SDR mode platform is scalar-compensated to avoid mismatching of HDR and SDR content rendered on the same LCD screen or panel.

Figure 2A:
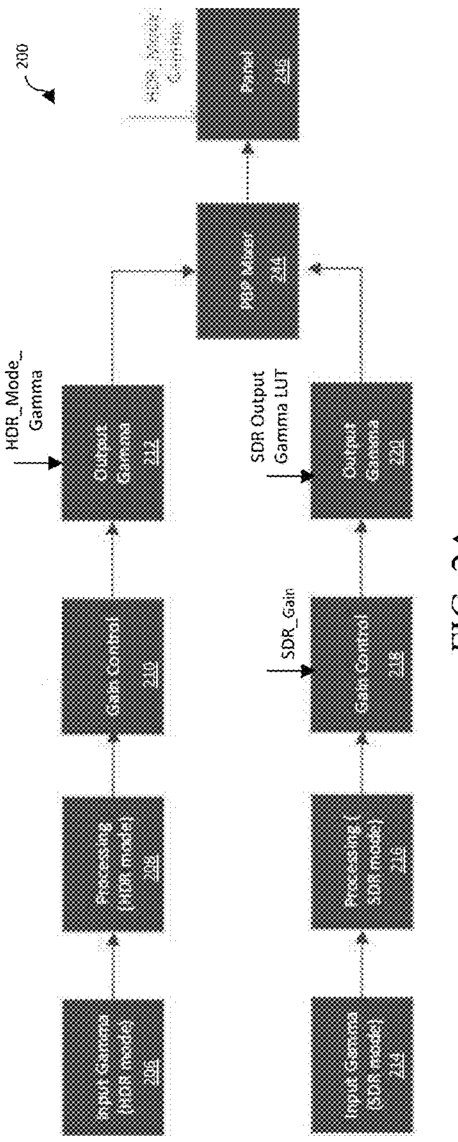
FIGS. 2A and 2B illustrate certain operative aspects of an embodiment of the system of FIG. 1.
Figure 2B:
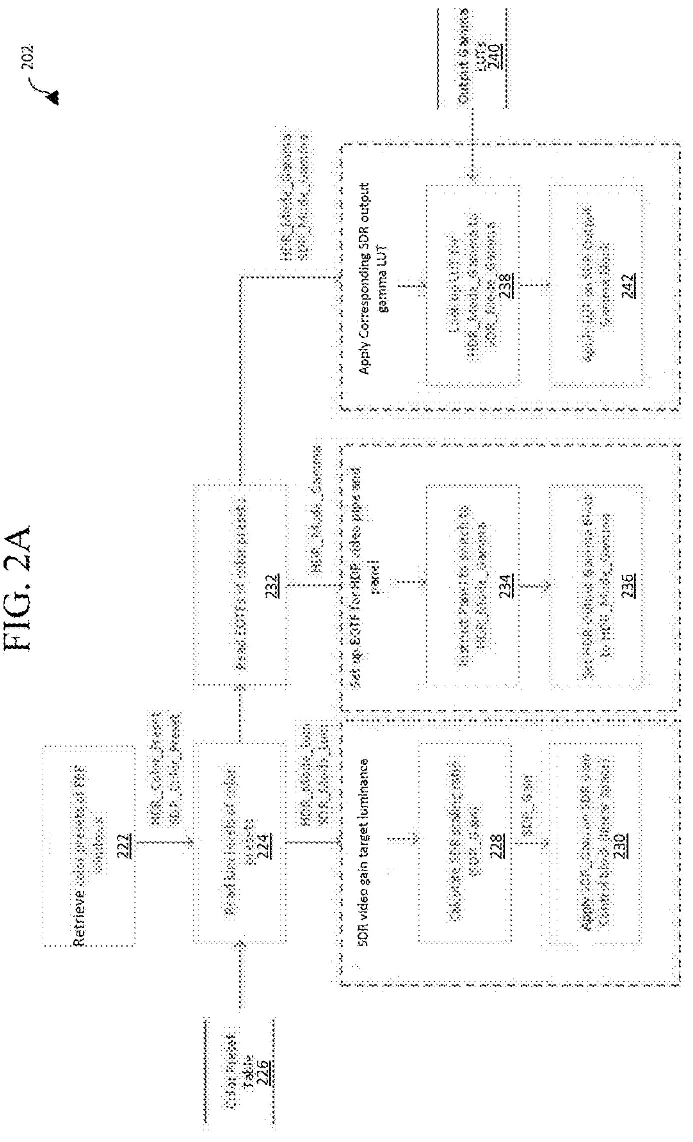

FIG. 1 illustrates a system to render mixed-mode HDR/SDR content (system) 100, the system implemented with a back-lit LCD. System 100 illustratively includes content mode detector 102 and mixed-mode processor 104 coupled thereto. In various embodiments, content mode detector 102 and mixed-mode processor 104 may be implemented in hardwired circuitry, program instructions executable by the processor of an information handling system, firmware, or combinations thereof. In one embodiment, system 100 is implemented in a scalar controller (FIGS. 2A and 2B).

Content node detector 102, in certain embodiments, is configured to detect a dynamic range (e.g., HDR, SDR) of the content of one or more distinct windows within an image. Content node detector 102 may detect the dynamic range(s) based on image data received from one or more sources communicatively coupled with system 100. Illustratively, content node detector 102 receives image data 106 from a first source and image data 108 from a second source.

Mixed-mode processor 104, in certain embodiments, is configured to process image data and, based on processed image data, to generate processing instructions 110. Mixed-mode processor 104 conveys processing instructions 110 to LCD panel, which based on the processing instructions, renders an image on the LCD panel. In the event that image data from separate sources prompts the rendering on the LCD panel of a multi-window image having different modes, then processing instructions 110 may include mode-specific electro-optical transfer functions (EOTFs) corresponding to each of the different modes. Each EOTF provides a mathematical relationship according to which the LCD converts digital signal values (image data) into brightness (luminance intensity) of an image. For a multi-window image in which the mode of the content of each window is different—HDR or SDR—processing instructions 110 generated by mixed-mode processor 104 provide a mode-specific EOTF for each mode.

With respect to HDR content, the HDR EOTF may be a Perceptual Quantizer (PQ) defined by SMPTE ST 2084. The PQ maps signal values to absolute brightness levels (e.g., 1000 nits). The bit depth dictated by the PQ is typically at least 10 bits. The maximum of a PQ brightness range is typically 1000 to 10,000 nits. With respect to SDR content, the SDR EOTF may be a gamma curve, such as gamma 2.2 or 2.4, defined by ITU-R BT.1886. The SDR EOTF maps signal values to brightness based on a relative power function and typically has an 8-bit bit depth.

Operatively, mixed-mode processor 104 is configured to respond to content mode detector 102's detecting image data corresponding to multiple windows within an image, the dynamic range of the content being different for two or more windows. For example, the content of image data 106 from the first source may be HDR content, and the content of image data 108 from a second source may be SDR content.

Mixed-mode processor 104 responds by setting (with processing instructions 110) the backlight of the LCD, determining an SDR scaling ratio, and generating an adjusted SDR gamma based on the scaling ratio.

Mixed-mode processor 104 may set the LCD backlight based on an HDR maximum brightness requirement. The HDR maximum brightness requirement is a fixed capability of the LCD and may be influenced by the HDR content. The SDR scaling ratio may be determined by mixed-mode processor 104 based on the HDR content and SDR content. Specifically, in certain embodiments, the scaling ratio may be calculated as an SDR mode luminance over an HDR mode luminance. In a multi-window environment in which both HDR and SDR content are rendered jointly, system 100 is capable of tone-mapping or converting HDR and SDR formats (e.g., RGB data range) based on target SDR luminance. Accordingly, mixed-mode processor 104 generates adjusted SDR gamma (e.g., adjusted gamma 2.2) to match the HDR EOTF (e.g., PQ).

Processing instructions 110 conveyed to LCD include the adjusted SDR gamma and HDR EOTF corresponding to the HDR content. In rendering the multi-window image on the LCD, a color and brightness of the HDR content and SDR content are dictated by the adjusted SDR gamma and HDR EOTF corresponding to the HDR content.

In certain embodiments illustrated in FIGS. 2A and 2B in the context of enabling the rendering of a multi-window image having a PBP configuration, system 100 is configured to implement dual HDR/SDR pipeline 200 for feeding processing instructions to the LCD. Dual HDR/SDR pipeline 200, illustrated in FIG. 2A, is implemented by processing 202 illustrated in FIG. 2B. Illustratively, system 100 is implemented in a scalar controller embodied in a scaler chip or scaler board operatively coupled with the LCD. The scalar controller is capable of performing signal conversion to convert input formats (analog or digital) into a format readable by the LCD. Image scaling, image processing, timing coordination, blacklight control, and other functions may also be performed by the scalar controller.

The HDR pipeline created by system 100 includes inputting an HDR gamma model 206 for creating an HDR gamma (HDR EOTF), processing 208 of input of HDR gamma model 206, setting gain control 210, and outputting the HDR gamma output 212 (HDR EOTF such as PQ curve). The SDR pipeline of dual HDR/SDR pipeline 200 includes inputting an SDR gamma model 214 for creating an SDR gamma (SDR EOTF), processing 216 of input SDR gamma mode 214, setting gain control 218, and outputting the SDR gamma output 220 (e.g., gamma 2.2).

In implementing dual HDR/SDR pipeline 200, system 100 performs processing 202. Content mode detector 102 is configured to initially at block 222 retrieve color precepts for each of the PBP windows of the multi-window image. Color presets of the LCD are predefined settings that adjust the manner in which colors appear on the LCD panel. The color presets may be configured to optimize the rendering with respect to different types of content and/or different lighting environments. At block 224, mixed-mode processor 104 reads luminance levels of the HDR content and SDR content (HDR mode luminance and SDR mode luminance, respectively) from color preset table 226. In implementing the HDR pipeline, mixed-mode processor 104 calculates an SDR scaling ratio (SDR gain) at block 228. The SDR scaling ratio is calculated by mixed-mode processor 104 as the ratio of the HDR mode luminance over the SDR mode luminance. At block 230, mixed-mode processor 104 applies the SDR ratio, providing the gain of gain control 218 of the SDR pipeline of dual HDR/SDR pipeline 200.

At block 232, mixed-mode processor 104 reads EOTFs for the HDR content and SDR content, reading the EOTFs from color preset table 226. Implementing the HDR pipeline of dual HDR/SDR pipeline 200, mixed-mode processor 104 at block 234 sends a command (part of processing instructions 110) to the LCD panel to cause the panel switch its gamma to the corresponding HDR gamma (HDR EOTF such as PQ) and at block 236 sets the HDR gamma output 212 accordingly. The corresponding HDR gamma may be one from a preconfigured HDR gamma table; HDR gamma tables may be prestored in the panel of the LCD or loaded on demand from the scalar controller to the LCD panel. At block 238, mixed-mode processor 104 generates adjusted SDR gamma (e.g., adjusted gamma 2.2) to match the HDR EOTF (e.g., PQ) by reading preconfigured HDR gamma-to-SDR gamma lookup table (LUT) 240 (FIGS. 3A and 3B). At block 242 applies the adjusted SDR gamma to SDR gamma output 220. Dual HDR/SDR pipeline 200 feeds HDR gamma output 212 and SDR gamma output 220 to PBP mixer 244 to generate a combined output. The combined output is utilized by mixed-mode processor 104 to generate processing instructions 110 that are fed to panel 246 of the LCD. In rendering the multi-window image on the LCD, a color and brightness of the HDR content and SDR content are dictated by processing instructions 110, which combine adjusted SDR gamma and the HDR EOTF corresponding to the HDR content FIGS. 3A and 3B illustrate a system for finding gamma conversion LUTs, which used by system 100 according to at least one embodiment of the present disclosure. Table 300 of FIG. 3A illustrates LUTs corresponding to current SDR Gamma (EOTF) and HDR Gamma (EOTF). Table 300 takes the form of a 2×3 matrix in which the rows correspond to SDR EOTFs, and the columns correspond to HDR EOTFs. Row 1 corresponds to gamma 2.2, and row 2 corresponds to gamma 2.6. Columns 1, 2, and 3 correspond, respectively, to HDRs PQ1000 (PQ ETOF with peak luminance of 1000 nits ($cd/m^2$)), PQ500 (PQ ETOF with peak luminance of 500 nits ($cd/m^2$)), and PQ400 (peak luminance of 400 nits ($cd/m^2$)). In table 300, the element of row 1, column 1, for example, is LUT_200_2.2, which indicates a look up table for SDR gamma 2.2 built with input points from the HDR PQ1000 curve. Table 302 of FIG. 3B illustrates the building of an LUT. Table 302 provides an exemplary equation for finding value x on an HDR gamma curve for values y (1 through 255) of an SDR gamma curve. Illustratively, an 8-bit SDR gamma curve (gamma 2.2) is used with the HDR EOTF implement in a PQ curve. In the equation, SDR_max_Lum is the maximum luminance of the SDR gamma curve.

Figure 4:
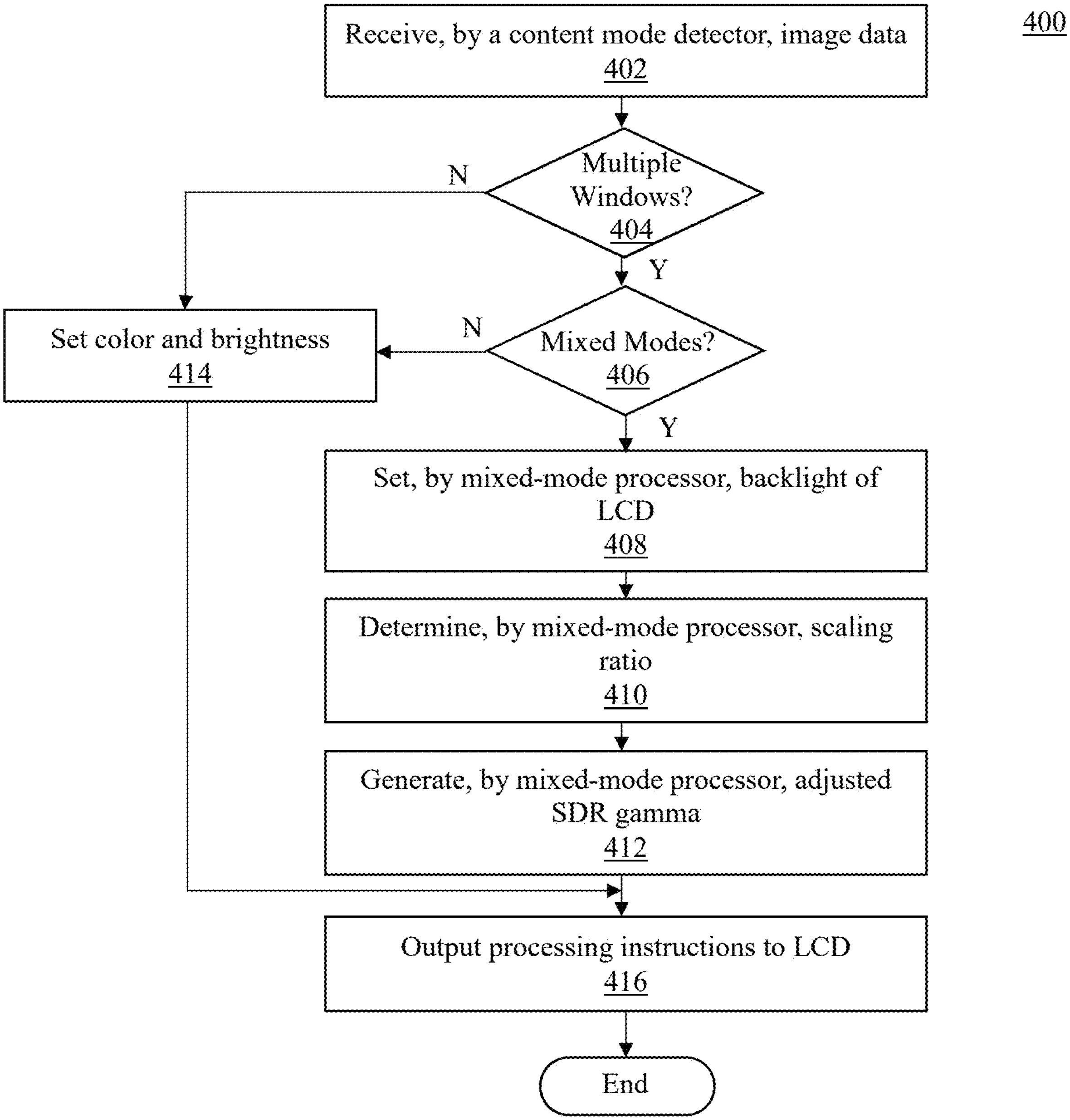
FIG. 4 is a flow diagram of a method for enabling the rendering of mixed-mode HDR/SDR content on an LCD according to at least one embodiment of the present disclosure.

FIG. 4 is a flow diagram of a method 400 to enable the rendering of a multi-window image on an LCD according to at least one embodiment of the present disclosure. It will be readily appreciated that not every method step set forth in this flow diagram is always necessary, and that certain steps of method 400 may be combined, performed simultaneously, in a different order, or perhaps omitted, without varying from the scope of the disclosure. Method 400 may be performed by a system such as system 100 described herein. Accordingly, the system may include a content mode detector and a mixed-mode processor.

At step 402, a content mode detector receives image data representing an image. If at decision step 404, the content mode detector detects multiple windows of the image, then the content mode detector detects the dynamic range of the content of each window. For example, the content mode detector may detect a first window within the image having HDR content and a second window within the image having SDR content.

If at decision step 406 the content mode detector detects multiple modes, namely HDR as well as SDR content, then at step 408 the mixed-mode processor sets the backlight of the LCD. The mixed-mode processor may set the backlight of the LCD based on a predetermined HDR maximum brightness requirement of the LCD.

At step 410 the mixed-mode processor determines an SDR scaling ratio. The mixed-mode processor may determine the SDR scaling ratio based on the HDR and SDR content (e.g., the ratio of HDR luminance over SDR luminance). At step 412, the mixed-mode processor generates an adjusted SDR gamma based on the SDR scaling ratio.

If at decision step 404 content mode detector fails to detect multiple windows or at step 406 detects that the dynamic range of multiple windows is the same, then system 100 at step 414 sets the color and brightness according to the single dynamic range, either HDR or SDR, for a single window or multiple windows. In any event, the system outputs processing instructions to the LCD at block 416. For a multi-window image in which the windows include HDR and SDR content, the processing instructions include the adjusted SDR gamma and an EOTF corresponding to the HDR content. In rendering the multi-window image on the LCD, a color and brightness of the HDR content and SDR content are dictated by the adjusted SDR gamma and the EOTF corresponding to the HDR content.

Method 400, in certain embodiments, may include determining color presets of the HDR content and the SDR content. The setting of the backlight of the LCD by the mixed-mode processor may be based on the color presets. Method 400 in some embodiments may further include determining luminance levels of the HDR content and the SDR content based on the respective color presets of the HDR content and the SDR content. In certain embodiments, the mixed-mode processor determines the scaling ratio based on HDR luminance over SDR luminance. Method 400 may include determining the EOTF corresponding to the HDR content and an EOTF corresponding to the SDR content based on the respective color presets of the HDR content and the SDR content.

The configuration of the multi-window image may be a PBP configuration and/or a PIP configuration. The HDR content may be received from a first source, and the SDR content may be received from a second source.

In certain embodiments, at least one window of the multi-window includes an image that is one of a collection of images of a video, each of the multiple images being an individual video frame. Method 400 may include determining an EOTF corresponding to HDR content and generating an adjusted SDR gamma by the mixed-mode processor for each of the individual video frames.

In certain embodiments of method 400, the determining of the EOTF corresponding to HDR content and the generating of the adjusted SDR gamma are performed by the mixed-mode processor in real time.

Figure 5:
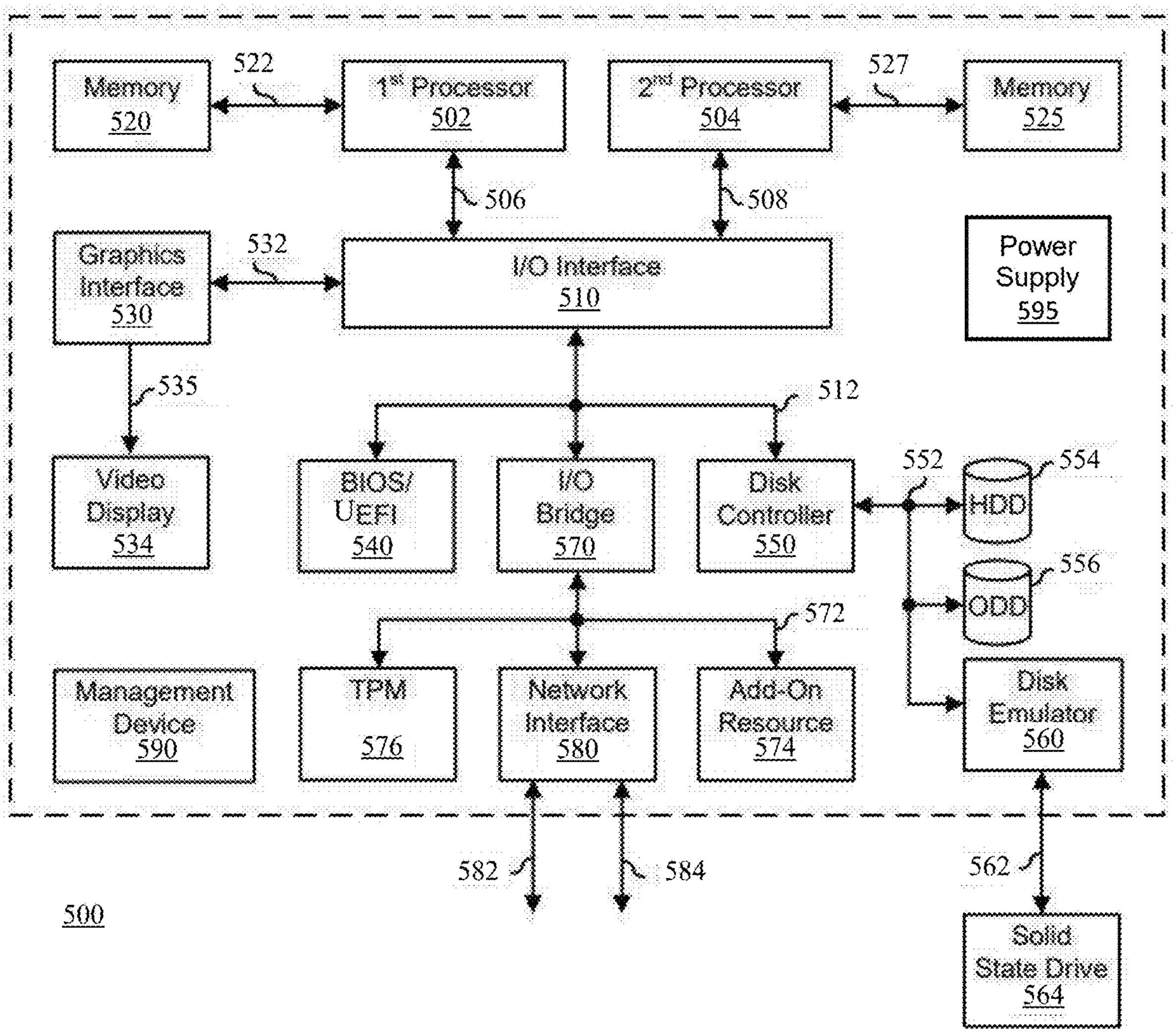
FIG. 5 is a block diagram of a general information handling system according to an embodiment of the present disclosure.

FIG. 5 shows a generalized embodiment of an information handling system 500 according to an embodiment of the present disclosure. Information handling system 500 may be substantially similar to an information handling system that utilizes an LCD. The LCD may be enabled by a system such as system 100 (FIGS. 1-4) to render multi-window images that include mixed-mode HDR/SDR content. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable mediums for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 564, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 564, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532 and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 4394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512 or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500.

Management device 590 can operate off a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

That which is claimed is:

1. A system to enable the rendering of mixed-mode high dynamic range (HDR) and standard dynamic range (SDR) content on a liquid crystal display (LCD), the system comprising:

a content mode detector configured to detect, based on received image data corresponding to an image, a dynamic range of content of each distinct window within the image; and a mixed-mode processor coupled with the content mode detector and configured to respond to the content mode detector's detecting a first window within the image having HDR content and a second window within the image having SDR content, wherein the mixed-mode processor is configured to respond by setting a backlight of the LCD based on a predetermined HDR maximum brightness requirement of the LCD, determining an SDR scaling ratio based on the HDR and SDR content, and generating an adjusted SDR gamma based on the SDR scaling ratio, wherein in rendering the image on the LCD, a color and brightness of the HDR content and SDR content are dictated by the adjusted SDR gamma and a predetermined electro-optical transfer function (EOTF) corresponding to the HDR content.

2. The system of claim 1, wherein the mixed-mode processor is further configured to determine color presets of the HDR content and the SDR content, and wherein the setting the backlight by the mixed-mode processor is based on the color presets.

3. The system of claim 2, wherein the mixed-mode processor is further configured to determine luminance levels of the HDR content and the SDR content based on the respective color presets of the HDR content and the SDR content.

4. The system of claim 2, wherein the mixed-mode processor is further configured to determine the EOTF corresponding to the HDR content and an EOTF corresponding to the SDR content based on the respective color presets of the HDR content and the SDR content.

5. The system of claim 1, wherein a configuration of the image is at least one of a picture-by-(PBP) configuration or a picture-in-picture (PIP) configuration.

6. The system of claim 1, wherein HDR content is received from a first source coupled with the system, and wherein the SDR content is received from a second source coupled with the system.

7. The system of claim 1, wherein the image is one of a plurality of images comprising individual video frames, and wherein the mixed-mode processor is configured to determine an EOTF corresponding to HDR content and generate an adjusted SDR gamma for each of the individual video frames.

8. The system of claim 1, wherein the mixed-mode processor is configured to determine the EOTF corresponding to HDR content and generate the adjusted SDR gamma in real time.

9. A method to enable rendering of a multi-window image on a liquid crystal display (LCD), the method comprising:

detecting, by a content mode detector, based on received image data corresponding to the multi-window image, a dynamic range of content of each window within the multi-window image; and responding, by a mixed-mode processor, to the content mode detector's detecting a first window within the multi-window image having high dynamic range (HDR) content and a second window within the multi-window image having standard dynamic range (SDR) content, wherein the responding includes:

setting a backlight of the LCD based on a predetermined HDR maximum brightness requirement of the LCD, determining an SDR scaling ratio based on the HDR and SDR content, and generating an adjusted SDR gamma based on the SDR scaling ratio, wherein in rendering the multi-window image on the LCD, a color and brightness of the HDR content and SDR content are dictated by the adjusted SDR gamma and a predetermined electro-optical transfer function (EOTF) corresponding to the HDR content.

10. The method of claim 9, further comprising:

determining color presets of the HDR content and the SDR content, wherein the setting the backlight by the mixed-mode processor is based on the color presets.

11. The method of claim 10, further comprising:

determining luminance levels of the HDR content and the SDR content based on the respective color presets of the HDR content and the SDR content.

12. The method of claim 10, further comprising:

determining the EOTF corresponding to the HDR content and an EOTF corresponding to the SDR content based on the respective color presets of the HDR content and the SDR content.

13. The method of claim 9, wherein a configuration of the multi-window image comprises at least one of a picture-by-(PBP) configuration or a picture-in-picture (PIP) configuration.

14. The method of claim 9, wherein the HDR content is received from a first source, and wherein the SDR content is received from a second source.

15. The method of claim 9, wherein at least one window of the multi-window includes an image that is one of a plurality of images comprising individual video frames, the method further comprising:

determining, by the mixed-mode processor, an EOTF corresponding to HDR content of each of the individual video frames; and generating an adjusted SDR gamma for each of the individual video frames.

16. The method of claim 9, wherein the determining the EOTF corresponding to HDR content and the generating the adjusted SDR gamma are determined, by the mixed-mode processor, in real time.

17. An information handling system, comprising:

a processor;

a memory coupled with the processor;

a liquid crystal display (LCD) coupled with the processor; and a system coupled with LCD to perform operations to enable rendering of a multi-window image on the LCD, wherein the operations include:

detecting, based on received image data corresponding to the multi-window image, a dynamic range of content of each window within the multi-window image; and responding to detecting a first window within the image having high dynamic range (HDR) content and a second window within the image having standard dynamic range (SDR) content, wherein the responding includes:

setting a backlight of the LCD based on a predetermined HDR maximum brightness requirement of the LCD, determining an SDR scaling ratio based on the HDR and SDR content, and generating an adjusted SDR gamma based on the SDR scaling ratio, wherein in rendering the multi-window image on the LCD, a color and brightness of the HDR content and SDR content are dictated by the adjusted SDR gamma and a predetermined electro-optical transfer function (EOTF) corresponding to the HDR content.

18. The information handling system of claim 17, wherein the operations further include:

determining color presets of the HDR content and the SDR content, wherein the setting the backlight is based on the color presets.

19. The information handling system of claim 18, wherein the operations further include:

determining luminance levels of the HDR content and the SDR content based on the respective color presets of the HDR content and the SDR content.

20. The information handling system of claim 18, wherein the operations further include:

determining the EOTF corresponding to the HDR content and an EOTF corresponding to the SDR content based on the respective color presets of the HDR content and the SDR content.

* * * * *